(12) United States Patent
Miller et al.

(10) Patent No.: US 9,995,314 B2
(45) Date of Patent: Jun. 12, 2018

(54) COOLING SYSTEM FOR A TURBINE ENGINE

(71) Applicant: General Electric Company, Schenectady, NY (US)

(72) Inventors: Brandon Wayne Miller, Cincinnati, OH (US); Jeffrey Anthony Hamel, Maineville, OH (US)

(73) Assignee: General Electric Company, Schenectady, NY (US)

( * ) Notice: Subject to any disclaimer, the term of this patent is extended or adjusted under 35 U.S.C. 154(b) by 525 days.

(21) Appl. No.: 14/803,862

(22) Filed: Jul. 20, 2015

(65) Prior Publication Data

US 2017/0023018 A1 Jan. 26, 2017

(51) Int. Cl.
| | |
|---|---|
| *F02C 7/14* | (2006.01) |
| *F04D 29/58* | (2006.01) |
| *F02C 7/141* | (2006.01) |
| *F02C 7/16* | (2006.01) |
| *F01D 5/08* | (2006.01) |

(Continued)

(52) U.S. Cl.
CPC ......... *F04D 29/5846* (2013.01); *F01D 5/081* (2013.01); *F02C 7/14* (2013.01); *F02C 7/141* (2013.01); *F02C 7/16* (2013.01); *F04D 19/02* (2013.01); *F04D 29/324* (2013.01); *F04D 29/541* (2013.01); *F05D 2220/32* (2013.01);

(Continued)

(58) Field of Classification Search
CPC ...... F04D 29/5846; F01D 5/081; F02C 7/141; F02C 7/14; F02C 7/16; F05D 2260/212; Y02T 50/676

See application file for complete search history.

(56) References Cited

U.S. PATENT DOCUMENTS

| | | |
|---|---|---|
| 2,711,074 A | 6/1955 | Howard |
| 3,080,716 A | 3/1963 | Cummings et al. |

(Continued)

FOREIGN PATENT DOCUMENTS

| | | |
|---|---|---|
| DE | 19544927 A1 | 4/1997 |
| EP | 0462458 A1 | 12/1991 |

(Continued)

OTHER PUBLICATIONS

"General Electric GE90-115B high bypass turbofan", Turbokart.com, Jun. 27, 2004.*

(Continued)

*Primary Examiner* — Steven Sutherland
(74) *Attorney, Agent, or Firm* — General Electric Company; Pamela A. Kachur (57) ABSTRACT

A gas turbine engine including a compressor section and a turbine section, coupled by one or more shafts, is provided. The compressor section progressively compresses air and includes an aft-stage of rotor blades rotatable about an axial direction of the gas turbine engine. A cooling system is included with the gas turbine engine for cooling compressed air in or from the compressor section. The cooling system includes a fluid tank for storing a volume of cooling fluid and one or more fluid lines in fluid communication with the fluid tank. The one or more fluid lines include an outlet positioned adjacent to the aft-stage of rotor blades for injecting cooling fluid into the compressed air proximate the aft-stage of rotor blades.

17 Claims, 9 Drawing Sheets

(51) Int. Cl.
*F04D 19/02* (2006.01)
*F04D 29/32* (2006.01)
*F04D 29/54* (2006.01)

(52) U.S. Cl.
CPC ....... *F05D 2260/212* (2013.01); *Y02T 50/676* (2013.01)

(56) References Cited

U.S. PATENT DOCUMENTS

| | | | |
|---|---|---|---|
| 3,280,555 A | | 10/1966 | Charpentier et al. |
| 5,054,279 A | * | 10/1991 | Hines .................... F01K 21/047 60/39.5 |
| 5,074,109 A | | 12/1991 | Mandet et al. |
| 5,697,209 A | | 12/1997 | Wettstein |
| 6,502,403 B1 | | 1/2003 | Tazaki et al. |
| 6,553,753 B1 | | 4/2003 | Payling et al. |
| 6,578,362 B1 | | 6/2003 | Coffinberry |
| 8,387,358 B2 | * | 3/2013 | Danis ..................... F02C 3/305 60/39.53 |
| 8,511,986 B2 | | 8/2013 | Alvanos et al. |
| 2001/0039764 A1 | | 11/2001 | Patterson |
| 2002/0108376 A1 | * | 8/2002 | Stevens .................. F02C 7/141 60/772 |
| 2002/0112465 A1 | | 8/2002 | Payling et al. |
| 2004/0255571 A1 | | 12/2004 | Fetescu et al. |
| 2007/0022732 A1 | | 2/2007 | Holloway et al. |
| 2007/0157626 A1 | | 7/2007 | Bergholz |
| 2011/0011096 A1 | * | 1/2011 | Edwards ................. F02C 7/185 60/801 |
| 2013/0036747 A1 | | 2/2013 | Fuchs et al. |
| 2014/0123657 A1 | | 5/2014 | Tham et al. |
| 2014/0123675 A1 | | 5/2014 | Tham et al. |
| 2017/0022900 A1 | | 1/2017 | Miller et al. |

FOREIGN PATENT DOCUMENTS

| | | |
|---|---|---|
| EP | 1149998 A2 | 10/2001 |
| EP | 2418367 A1 | 2/2012 |
| GB | 879745 A | 10/1961 |
| GB | 1273766 A | 5/1972 |
| GB | 2342693 A | 4/2000 |
| JP | 05332164 A | 12/1993 |
| JP | 2003530501 A | 10/2003 |
| KR | 20150061229 A | 6/2015 |
| WO | 0131181 A1 | 5/2001 |

OTHER PUBLICATIONS

European Search Report and Opinion issued in connection with Related EP Application No. 16180300.2 dated Dec. 7, 2016.

European Search Report and Opinion issued in connection with Corresponding EP Application No. 16180308.5 dated Dec. 21, 2016.

GE Related Case Form.

Unofficial English Translation of Japanese Office Action issued in connection with corresponding JP Application No. 2016138086 dated Jul. 4, 2017.

Unofficial English Translation of Chinese Office Action issued in connection with corresponding CN Application No. 201610571628.6 dated Jul. 10, 2017.

* cited by examiner

COOLING SYSTEM FOR A TURBINE ENGINE

FIELD OF THE INVENTION

The present subject matter relates generally to a cooling system for a gas turbine engine.

BACKGROUND OF THE INVENTION

A gas turbine engine generally includes a fan and a core arranged in flow communication with one another. Additionally, the core of the gas turbine engine general includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

It is desirable to increase an overall pressure ratio of the gas turbine engine in order to increase an efficiency of the gas turbine engine. The overall pressure ratio refers generally to a ratio of a stagnation pressure measured at a forward end of the compressor section to a pressure measured at an aft end of the compressor section. However, as the overall pressure ratio increases, a temperature of the compressed air also increases. The materials used to construct rotor blades and/or stator vanes in the compressor section typically are not designed to withstand the heightened temperatures that can accompany an increased overall pressure ratio. Additionally, as the overall pressure ratio can be greatest during takeoff and climb of an aircraft having such an engine, susceptibility to heightened temperatures that accompany increased overall pressure ratios can be particularly limiting to high cycle count engines, such as those installed in a narrow-body aircraft.

Accordingly, a device for cooling compressed air in a compressor section of a gas turbine engine would be useful. More particularly, a device capable of cooling certain components of a compressor section susceptibility to heightened temperatures that accompany increased overall pressure ratios during certain engine operations would be especially beneficial.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a gas turbine engine defining an axial direction is provided. The gas turbine engine includes a compressor section for progressively compressing air, the compressor section including an aft-stage of rotor blades rotatable about the axial direction. The gas turbine engine additionally includes a cooling system for cooling compressed air in or from the compressor section. The cooling system includes a fluid tank for storing a volume of cooling fluid and one or more fluid lines in fluid communication with the fluid tank. The one or more fluid lines include an outlet positioned adjacent to the aft-stage of rotor blades of the compressor section for injecting cooling fluid into the compressed air proximate the aft-stage of rotor blades.

In another exemplary embodiment of the present disclosure, a cooling system for cooling compressed air in or from a compressor section of an aeronautical gas turbine engine is provided. The cooling system includes a fluid tank for storing a volume of cooling liquid and one or more fluid lines in fluid communication with the fluid tank. The one or more fluid lines include an outlet and are configured to be mounted such that the outlet is positioned adjacent to an aft-stage of rotor blades of the compressor section for injecting cooling liquid into compressed air proximate the aft-stage of rotor blades of the compressor section.

In one exemplary aspect of the present disclosure, a method for cooling an aft end of a compressor section of a gas turbine engine is provided. The method includes operating the gas turbine engine to achieve a high power output and injecting a consumable cooling liquid into compressed air proximate the aft end of the compressor section using a cooling system having a fluid line defining an outlet positioned adjacent to the aft end of the compressor section.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Figure 1:
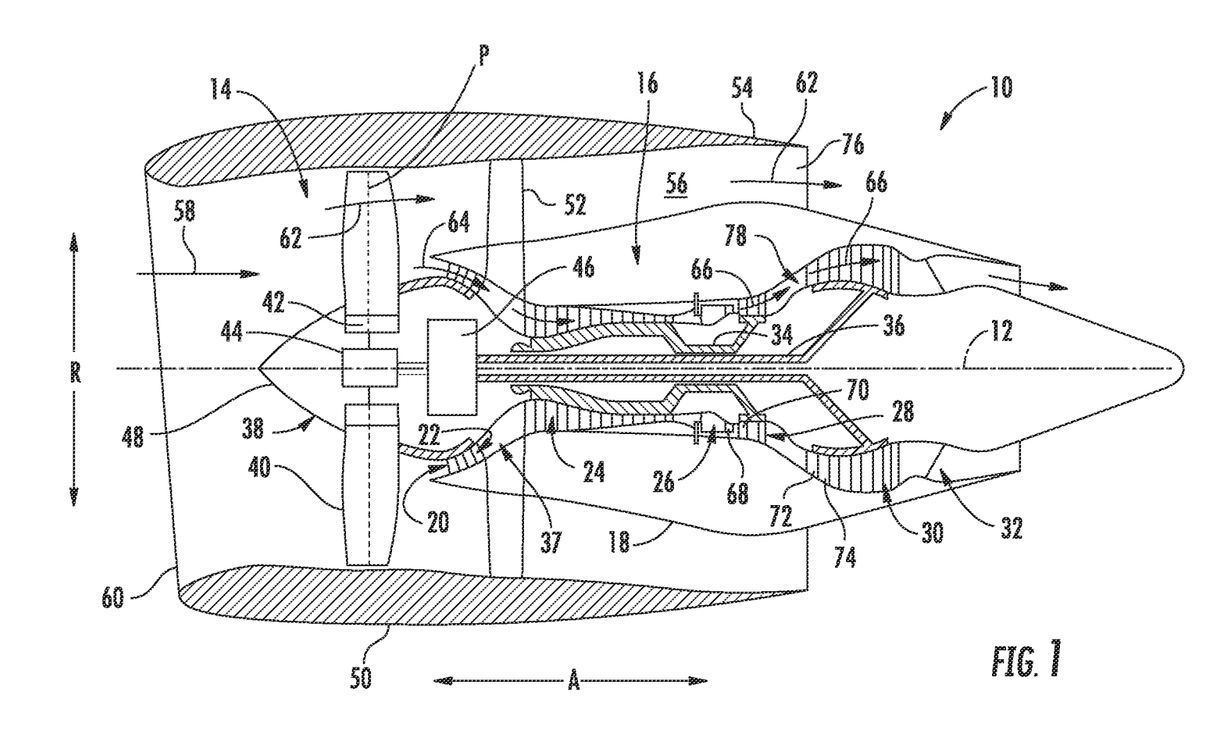
FIG. 1 is a schematic cross-sectional view of an exemplary gas turbine engine according to various embodiments of the present subject matter.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference), a radial direction R, and a circumferential direction C (see FIG. 4). In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The compressor section, combustion section 26, and turbine section together define a core air flowpath 37.

For the embodiment depicted, the fan section 14 includes a variable pitch fan 38 having a plurality of fan blades 40 coupled to a disk 42 in a spaced apart manner. As depicted, the fan blades 40 extend outwardly from the disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58, enters the turbofan 10 through an associated inlet 60 of the nacelle 50 and/or fan section 14. As the volume of air 58 passes across the fan blades 40, a first portion of the air 58, as indicated by arrows 62, is directed or routed into the bypass airflow passage 56 and a second portion of the air 58, as indicated by arrow 64, is directed or routed into the core air flowpath 37, or more particularly, into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the exemplary turbofan engine 10 depicted in FIG. 1 is by way of example only, and that in other exemplary embodiments, aspects of the present disclosure may additionally, or alternatively, be applied to any other suitable gas turbine engine. For example, in other exemplary embodiments, the gas turbine engine may be any other suitable aeronautical gas turbine engine, such as a turbojet engine, turboshaft engine, turboprop engine, etc.

Figure 2:
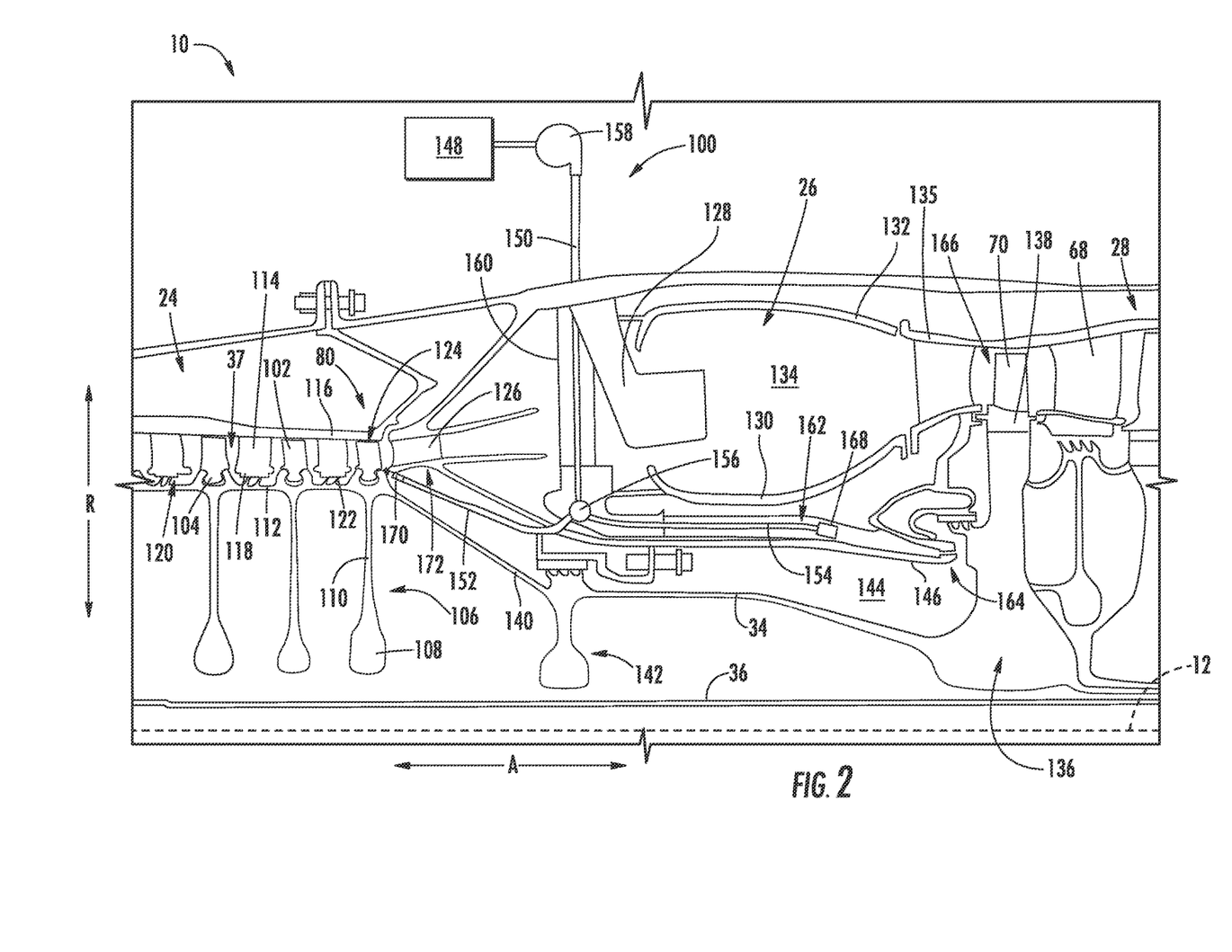
FIG. 2 is close-up, simplified, schematic view of the exemplary gas turbine engine of FIG. 1 including a cooling system in accordance with an exemplary embodiment of the present disclosure.

Referring now to FIG. 2, a close-up, side, schematic view of the turbofan engine 10 of FIG. 1 is provided. More particularly, FIG. 2 provides a close-up view of an aft end of the compressor section (or more particularly, an aft end 80 of the HP compressor 24), the combustion section 26, and a forward end 82 of the turbine section (or more particularly, a forward end 82 of the HP turbine 28). Additionally, as will be discussed in greater detail below, the turbofan engine 10 includes a cooling system 100 in accordance with an exemplary embodiment of the present disclosure for cooling compressed air in or from the compressor section and/or for cooling certain components of the compressor section proximate to the aft end 80 of the HP compressor 24.

As depicted, the HP compressor 24 includes various stages of rotor blades 102 rotatable about the longitudinal centerline 12. Each rotor blade 102 in a particular stage is attached at a root 104 to one of a plurality HP compressor rotors 106. Each HP compressor rotor 106 includes a bore 108 and a web 110 and is connected to an adjacent HP compressor rotor 106 via a spacer arm 112. Each stage of rotor blades 102 progressively compresses the air flowing through that portion of the core air flowpath 37. Disposed between each adjacent stage of rotor blades 102 in the HP compressor 24 is a stage of stationary stator vanes 114 attached to an HP compressor liner 116. An inner surface of the HP compressor liner 116 is exposed directly to and at least partially defines the core air flowpath 37. Each stator vane 114 includes a seal 118 at a radially inner end 120, positioned adjacent to a plurality of teeth 122 extending generally along the radial direction R from the spacer arms 112. The seal 118 and teeth 122 are configured to reduce an amount of airflow allowable around the radially inner ends 118 of the stator vane 114.

After the compressed air flows past an aft-stage 124 of rotor blades 102, the compressed air flows through a diffuser 126 for channeling the compressed air and directing such compressed air into the combustion section 26. For the embodiment depicted, the diffuser 126 is further configured to reduce a Mach number of the flow of compressed air such that the fuel may more easily be ignited in the combustion section 26.

The compressed air from the HP compressor 24 is mixed with fuel using one of a plurality of fuel-air mixers 128 of the combustion section 26. The combustion section 26 additionally includes an inner liner 130 and an outer liner 132, the inner and outer liners 130, 132 together at least partially defining a combustion chamber 134. The mixture of fuel and compressed air is combusted in the combustion chamber 134 to generate the combustion gases, which flow from the combustion chamber 134 into the HP turbine 28. The flow of combustion gases through the HP turbine 28 rotates the sequential stages of HP turbine rotor blades 70. Disposed between or adjacent to each stage of HP turbine rotor blades 70 is stage of turbine stator vanes 68 attached to a liner 135. An inner surface of the HP turbine liner 135 is exposed directly to and at least partially defines the core air flowpath 37. Additionally, each HP turbine rotor blades 70 in a particular stage of HP turbine rotor blades 70 is attached at a base 138 to a respective HP turbine rotor 136. Rotation of the HP turbine blades 70 and a respective HP turbine rotor 136 drives the HP turbine 28. The HP turbine rotor 136 is coupled with the HP rotor shaft 34, which is also coupled to the HP compressor rotor 106 through an arm 140 of the HP rotor shaft 34. Accordingly, as discussed, rotation of the HP turbine rotor blades 70 drives the HP compressor 24.

Notably, the HP rotor shaft 34, for the embodiment depicted, additionally includes a compressor discharge pressure seal 142, which for the embodiment depicted is configured for metering a flow of compressed air from the HP compressor 24 to a radially inner cavity 144 defined between the HP rotor shaft 34 and a forward inner nozzle support member 146.

As stated, the exemplary turbofan engine 10 depicted in FIG. 2 additionally includes the exemplary cooling system 100. The exemplary cooling system 100 generally includes a fluid tank 148 for storing a volume of cooling fluid and one or more fluid lines. The one or more fluid lines are in fluid communication with the fluid tank 148 for injecting cooling fluid into, e.g., the compressed air proximate the aft-stage 124 of rotor blades 102 of the HP compressor 24. More specifically, for the exemplary cooling system 100 depicted, the one or more fluid lines include a supply fluid line 150 in fluid communication with the tank 148, a compressor fluid line 152, and a turbine fluid line 154. Additionally, the exemplary cooling system 100 includes a valve 156, the valve 156 including an inlet fluidly connected with the supply fluid line 150, a first outlet fluidly connected to the compressor fluid line 152, and a second outlet fluidly connected to the turbine fluid line 154.

The valve 156 may be a standard three-way valve providing a fixed ratio of cooling fluid from the inlet to the first outlet and second outlet (i.e., from the supply fluid line 150 to the compressor fluid line 152 and the turbine fluid line 154). Alternatively, however, the valve 156 may be a variable throughput, three-way valve configured to alter the ratio of cooling fluid provided from the inlet to the first outlet and second outlet. For example, the valve 156 may be configured to provide anywhere from zero percent (0%) to one hundred percent (100%) of the cooling fluid from the inlet to the first outlet. Additionally, the valve 156 may be configured to provide anywhere from zero percent (0%) to one hundred percent (100%) of the cooling fluid from the inlet to the second outlet. Moreover, the valve 156 may be capable of restricting a total amount of cooling fluid allowable therethrough to both the first and second outlets. Accordingly, the valve 156 may be capable of effectively shutting off a flow of cooling fluid to the compressor fluid line 152 and/or the turbine fluid line 154 based on, e.g., a need for such cooling.

In certain exemplary embodiments, the cooling fluid may be a consumable cooling liquid, such as water or a glycol-water mixture (which may be resistant to, e.g., freezing). Alternatively, however, in other embodiments, any other suitable cooling fluid may be provided. Notably, as used herein, the term "consumable" with reference to the cooling fluid refers to the manner in which the cooling fluid reduces a temperature of a component. Specifically, in at least certain exemplary aspects, the term consumable refers to a liquid which is configured to vaporize after contacting a component, absorbing heat and reducing a temperature of such component.

As is also depicted in FIG. 2, the exemplary cooling system 100 further includes a pump 158 for generating a flow of cooling fluid from the tank 148 through a fluid line, such as the supply fluid line 150. The pump 158 may be a rotary pump including an impeller, or alternatively, may be any other suitable fluid pump. Additionally, for the embodiment depicted, the pump 158 and the fluid tank 148 are positioned outward of the core air flowpath 37 along the radial direction R. Accordingly, at least one of the one or more fluid lines extends through the core air flowpath 37 to a location inward of the core air flowpath 37 along the radial direction R. For the embodiment depicted, a separate tube 160 extending through the core air flowpath 37 is provided for housing the fluid line(s) of the cooling system 100 extending through the core air flowpath 37. Notably, in certain exemplary embodiments, the pump 158 and/or the valve 156 may be in operable communication with a controller of the turbofan engine 10 to control operation of the cooling system 100. For example, the controller may regulate a flow rate of the cooling fluid through the cooling system 100 based on, e.g., an operating condition of the turbofan engine 10, or in response to one or more temperature sensors (not shown).

It should be appreciated, however, that in other exemplary embodiments, the pump 158 and/or tank 148 may alternatively be positioned inward from the core air flowpath 37 along the radial direction R. In such a configuration, or in other configurations, the pump 158 may be directly and/or indirectly coupled to, e.g., the HP shaft 34 and driven by, e.g., the HP shaft 34.

Referring still to FIG. 2, the turbine fluid line 154 is configured for injecting cooling fluid into a cooling airflow provided to the turbine section. Specifically, for the embodiment depicted, the turbine fluid line 154 is configured for injecting cooling fluid into a cooling airflow flowing from the HP turbine 28 and through a cooling channel 162. For the embodiment depicted, the cooling channel 162 is at least partially defined by the forward inner nozzle support 146. Additionally, the cooling channel 162 includes an axial inducer 164, which brings the cooling airflow from a static frame of reference to a rotating frame of reference while minimizing a temperature rise due to stagnation onto the HP turbine rotor 136. The cooling airflow provided through the cooling channel 162 may be used as cooling air provided to reduce a temperature of certain components in the HP turbine 28. For example, the cooling airflow provided through the cooling channel 162 may be provided to the HP turbine rotor blades 70, such as a first stage 166 of HP turbine rotor blades 70, and/or as cavity purge air for a cavity of the HP turbine rotor 136.

As shown, the turbine fluid line 154 extends from the valve 156 and through at least a portion of the cooling channel 162 towards the HP turbine 28. The turbine fluid line 154 includes a nozzle 168 defining an outlet for injecting cooling fluid into the cooling air flowing through the cooling channel 162. The cooling fluid injected into the cooling air flowing through the channel 162 may reduce a temperature of the cooling air, such that less cooling air is required to maintain a desired temperature of certain components in the HP turbine 28 and/or such that a temperature of certain components in the HP turbine 28 may be further reduced to increase a life of such components. Notably, if less cooling air is required to maintain a desired temperature of certain components in the HP turbine 28, less air is required to be taken from the compressor section, such that an efficiency of the turbofan engine 10 may be increased. It should be appreciated, however, that in other exemplary embodiments, the turbine fluid line 154 may extend to any other suitable location to decrease a temperature of cooling air provided to, e.g., the HP turbine 28. For example, in other exemplary embodiments, the turbine fluid line 154 may extend through the forward inner nozzle support 146 for indirectly spraying cooling fluid onto the one or more HP turbine rotors 136.

It should also be appreciated that such a configuration differs from prior art configurations that have included fluid injection systems in the core air flowpath 37 extending through the turbine section. Such prior art configurations are set up to reduce an overall temperature of the airflow in the core air flowpath 37 extending through the turbine section. By contrast to these prior art configurations, the present configuration may inject cooling fluid into the cooling airflow provided to certain components of the turbine section for reducing a temperature of the cooling airflow itself. As will be discussed below, the configuration disclosed herein requires less cooling fluid than the prior art configurations.

Figure 3:
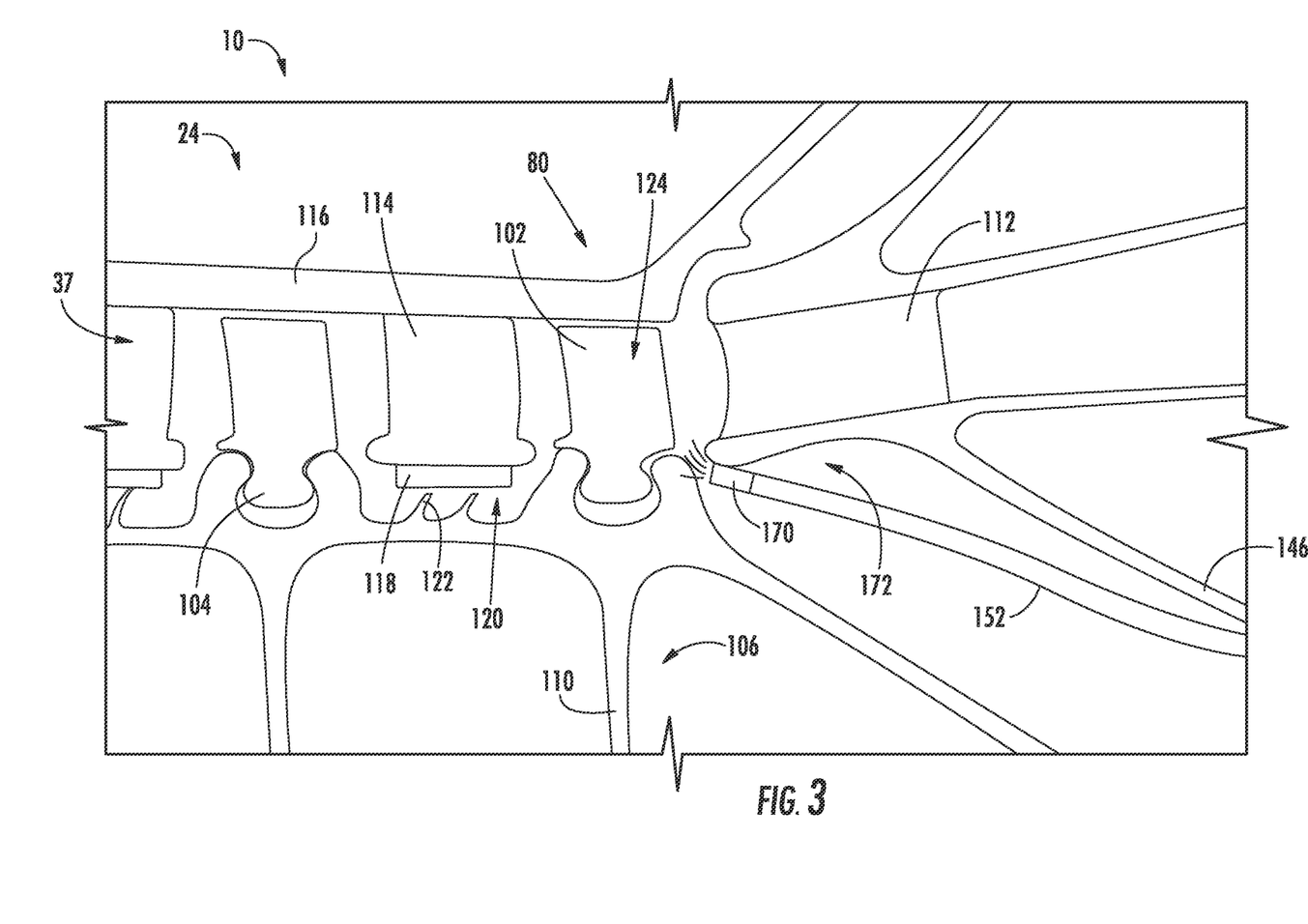
FIG. 3 is a close-up, simplified, schematic view of an aft end of a compressor section of the exemplary gas turbine engine of FIG. 1 and a portion of the exemplary cooling system depicted in FIG. 2.

Referring now also to FIG. 3, a close-up view of the aft end 80 of the HP compressor 24 is provided. Notably, one measure of an efficiency of the turbofan engine 10 is an overall pressure ratio of the turbofan engine 10. The overall pressure ratio refers generally to a ratio of a pressure at the aft end 80 of the compressor section to a stagnation pressure at the forward end of the compressor section. However, as the overall pressure ratio of the turbofan engine 10 increases, a temperature of the compressed air and components at the aft end 80 of the HP compressor 24 also increases. In order to allow for an increased overall pressure ratio without damaging the HP compressor 24, the exemplary cooling system 100 depicted in FIGS. 2 and 3 includes the compressor fluid line 152 for cooling one or both of the compressed air in or from the aft end 80 of the HP compressor 24 or certain components of the HP compressor 24 at the aft end 80 of the HP compressor 24.

Specifically, the compressor fluid line 152 is configured for injecting cooling fluid into the compressed air proximate the aft-stage 124 of rotor blades 102 of the HP compressor 24. The compressor fluid line 152 includes an outlet, or rather includes a nozzle 170 defining an outlet, positioned adjacent to the aft-stage 124 of rotor blades of the HP compressor 24. As used herein, "positioned adjacent to the aft-stage 124 of rotor blades of the HP compressor 24" refers to being positioned close enough to inject a flow of cooling fluid into the compressed air in the aft end 80 of the HP compressor 24. For the exemplary embodiment depicted, the compressor fluid line 152 is attached to a stationary frame member, inward of the core air flowpath 37 along the radial direction R, at a location immediately downstream of the aft-stage 124 of rotor blades 102. More particularly, for the embodiment depicted, the compressor fluid line 152 is attached to a forward end 172 of the forward inner nozzle support 146, at a location inward of the diffuser 126 along the radial direction R. With such a configuration, the outlet defined by the nozzle 170 is located immediately downstream of the aft-stage 124 of rotor blades 102. However, in other exemplary embodiments, the compressor fluid line 152 may alternatively be attached to any other suitable stationary member allowing the nozzle to inject a flow of cooling fluid to the aft end 80 of the HP compressor 24.

As stated, for the embodiment depicted, the nozzle 168 is positioned immediately downstream of the aft-stage 124 of rotor blades 102. Accordingly, to inject a flow of cooling fluid to the aft end 80 of the HP compressor 24, the nozzle 168 is configured to spray the cooling fluid through the outlet generally towards a forward end of the HP compressor 24 (i.e., in an upstream direction). Notably, during operation, i.e., when the aft-stage 124 of rotor blades 102 are rotating about the axial direction A, the high pressure, compressed air may try to flow to areas of lower pressure. For example, the high pressure, compressed air may try to flow around the radially inner end 120 of the stator vanes 114 to an upstream location. Accordingly, the airflow through the aft end 80 of the HP compressor 24 tends to swirl around in the area adjacent to the seal 118 of the stator vane 114 and the plurality of teeth 122 of the HP compressor rotor 106. As the overall pressure ratio of the turbofan engine 10 is increased, a temperature of these components may also increase—more so than other components—due to the swirling of such high temperature compressed air. Accordingly, by injecting the cooling fluid into the compressed air proximate the aft-stage 124 of rotor blades 102, the cooling fluid can travel forward to the areas of increased temperatures (i.e., where the compressed air is swirling) and vaporize. The vaporization of the cooling fluid absorbs heat and cools the components and/or the compressed air.

Thus, a gas turbine engine having a cooling system 100 in accordance with an exemplary embodiment present disclosure may be capable of increasing its overall pressure ratio without risk of damaging certain components at an aft end of a compressor section. Accordingly, a gas turbine engine having a cooling system 100 in accordance with an exemplary embodiment of the present disclosure may be capable of achieving a higher efficiency, while increasing a lifespan of certain components at an aft end of the compressor section.

Figure 4:
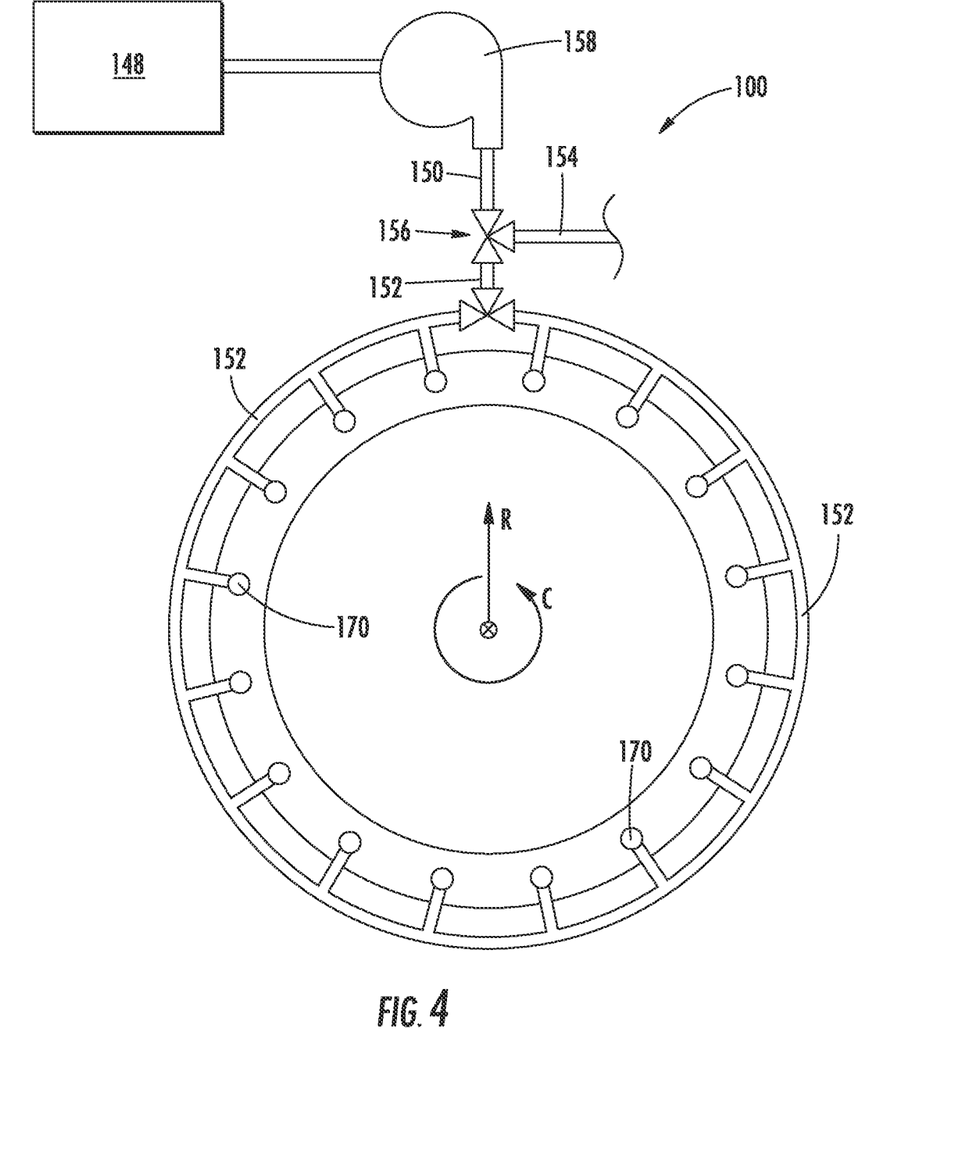
FIG. 4 is a schematic view of the exemplary cooling system depicted in FIG. 2, taken along an axial direction of the exemplary gas turbine engine of FIG. 1.

Referring now also to FIG. 4, a simplified schematic view along the axial direction A of the turbofan engine 10 is provided of the exemplary cooling system 100 of FIG. 2. As shown, for the embodiment depicted, the one or more fluid lines further includes a plurality of compressor fluid lines 152. The plurality of compressor fluid lines 152 each include an outlet, or rather a nozzle 170 defining an outlet, with the nozzles 170 and outlets of the plurality of fluid lines 152 spaced around the turbofan engine 10 about the circumferential direction C of the turbofan engine 10. The outlet of each of the plurality of compressor fluid lines 152 may be positioned adjacent to the aft-stage 124 of rotor blades 102 of the HP compressor 24 for injecting cooling fluid into the compressed air proximate the aft-stage 124 rotor blades 102. For the embodiment depicted, the plurality of compressor fluid lines 152 includes sixteen (16) compressor fluid lines 152 circumferentially spaced about the axial direction A and positioned adjacent to the aft-stage 124 rotor blades 102 of the HP compressor 24. However, in other exemplary embodiments, the plurality of compressor fluid lines 152 may include less than sixteen (16) compressor fluid lines 152, or alternatively the plurality of fluid lines may include at least twenty (20) compressor fluid lines 152, at least twenty-five (25) compressor fluid lines 152, or at least thirty (30) compressor fluid lines 152.

It should be appreciated, that in certain exemplary embodiments, the cooling system 100 may additionally include a similar configuration of turbine fluid lines 154. More particularly, in certain exemplary embodiments, the cooling system 100 may additionally include a plurality of turbine fluid lines 154 spaced along the circumferential direction C in, e.g., the cooling airflow channel 162. However, in other exemplary embodiments, the cooling system 100 may have any other suitable configuration for the turbine fluid lines 154. Alternatively, in still other exemplary embodiments, the cooling system 100 may not include any turbine fluid lines 154, and instead may be focused on providing a cooling fluid to, e.g., the aft end 80 of the HP compressor 24.

In certain embodiments, the cooling system 100 may be configured to inject up to two pounds of cooling fluid per second into the compressed air proximate the aft-stage 124 of rotor blades 102 of the HP compressor 24 (e.g., through the compressor fluid line 152). Alternatively, however, the cooling system 100 may be configured to inject up to about three pounds of cooling fluid per second, up to about four pounds of cooling fluid per second, up to about five pounds of cooling fluid per second, or up to about six pounds of cooling fluid per second into the compressed air proximate the aft-stage 124 of rotor blades 102 of the HP compressor 24. It should be appreciated, that as used herein, terms of approximation, such as "about" or "approximately," refer to being within a ten percent (10%) margin of error.

Additionally, or alternatively, the cooling system 100 may be configured to inject cooling fluid into the compressed air proximate the aft-stage 124 of rotor blades 102 of the HP compressor 24 (e.g., through the compressor fluid line 152) at a rate greater than about 0.05% of a mass flow rate of the compressed air flowing through the HP compressor 24 and less than about ten percent (10%) the mass flow rate of the compressed air flowing through the HP compressor 24. However, in other embodiments, the cooling system 100 may be configured to inject between about 0.05% and about five percent (5%), between about 0.05% and about three percent (3%), or between about 0.05% and about two percent (2%) of the mass flow rate of the compressed air flowing through the HP compressor 24.

Notably, the cooling system 100 may additionally, or alternatively, be configured to inject cooling fluid into, e.g., the cooling airflow through the turbine fluid line(s) 154 at a same or similar rate as through the compressor fluid line(s) 152 and/or at a same or similar ratio as through the compressor fluid line(s) 152.

Further, in certain exemplary aspects, the cooling system 100 may only be operated during times wherein an increased overall pressure ratio is desired. For example, as discussed below with respect to FIG. 9, the cooling system 100 may only be operated to cool the aft end 80 of the HP compressor 24 during periods of peak power of the turbofan engine 10, such as when an aircraft having such an exemplary turbofan engine 10 is taking off or climbing.

As stated, a cooling system 100 in accordance certain exemplary embodiments of the present disclosure may be capable of cooling at least one of the airflow proximate the aft-stage 124 of rotor blades in the HP compressor 24, or certain components of the HP compressor 24 proximate the aft-stage 124 of rotor blades in the HP compressor 24. Thus, a cooling system 100 in accordance with certain exemplary embodiments of the present disclosure may allow for an increased overall pressure ratio of the gas turbine engine.

Figure 5:
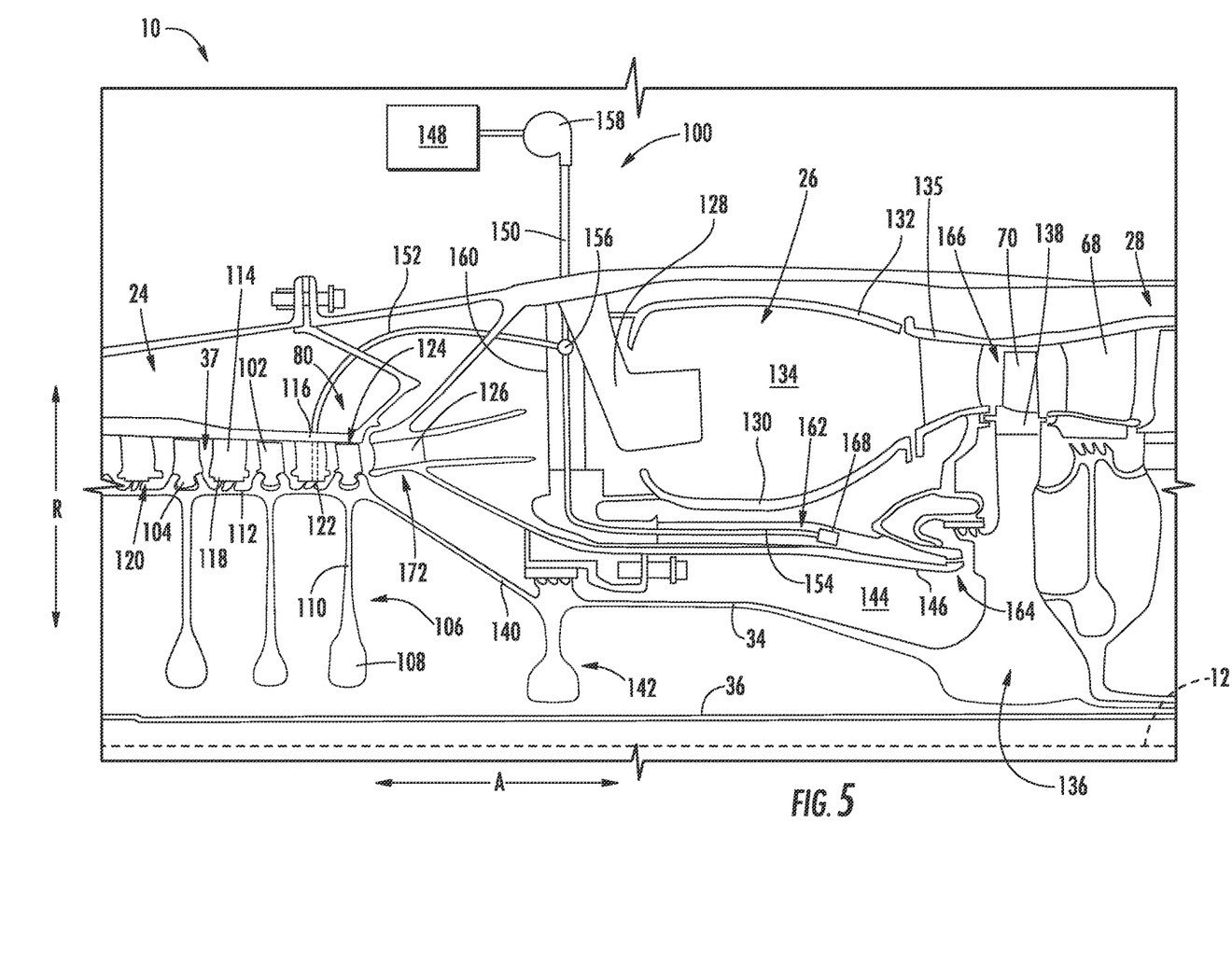
FIG. 5 is a close-up, simplified, schematic view of the exemplary gas turbine engine of FIG. 1 including a cooling system in accordance with another exemplary embodiment of the present disclosure.
Figure 6:
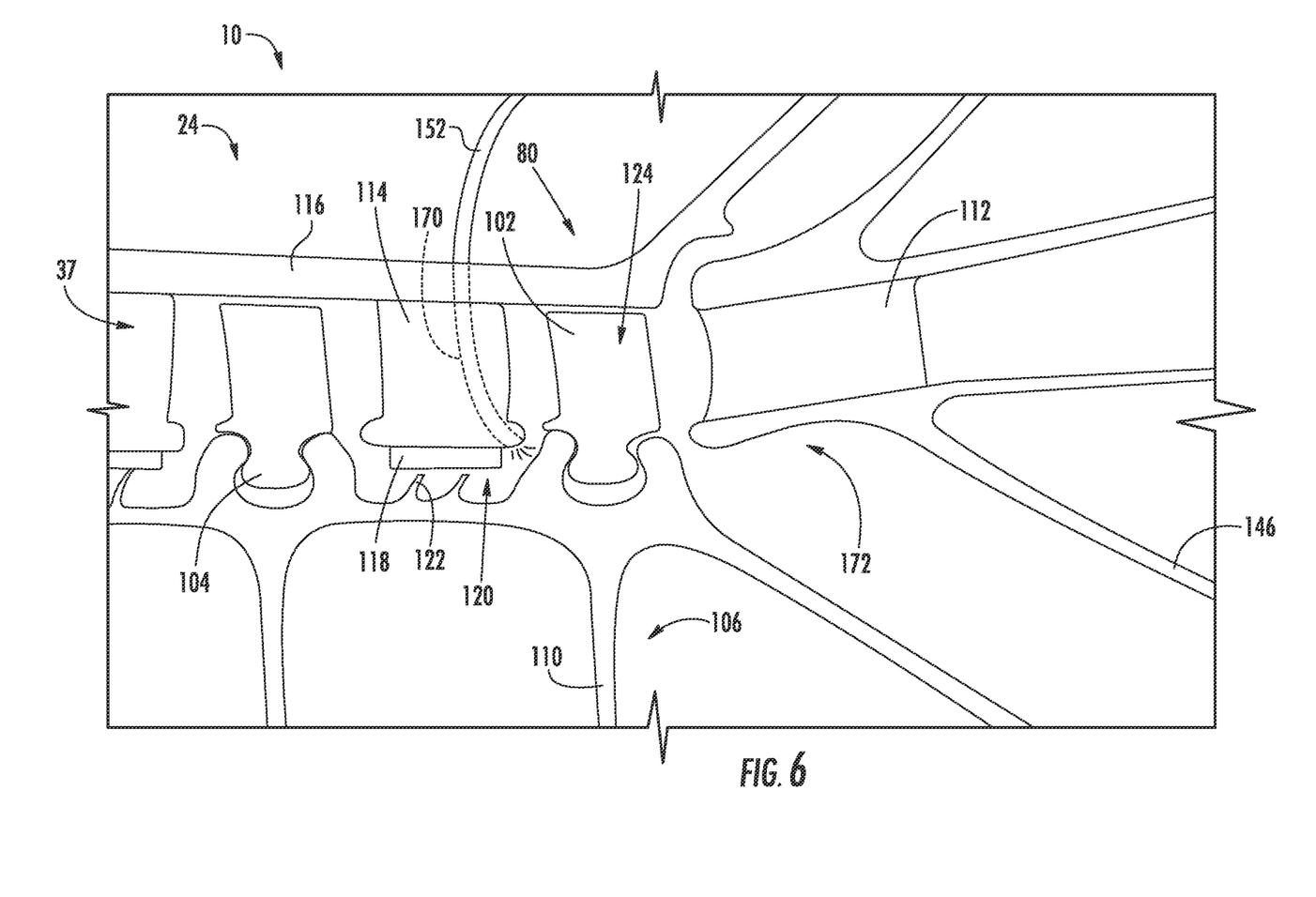
FIG. 6 is a close-up, simplified, schematic view of an aft end of a compressor section of the exemplary gas turbine engine of FIG. 1 and a portion of the exemplary cooling system depicted in FIG. 5.

Referring now to FIGS. 5 and 6, an alternative embodiment of the exemplary cooling system 100 described above with reference to FIGS. 2 through 4 is provided. More particularly, FIG. 5 provides a simplified schematic view of the exemplary turbofan engine 10 of FIG. 1, including a cooling system 100 in accordance with another exemplary embodiment of the present disclosure; and FIG. 6 provides a close-up, schematic view of the aft end 80 of the HP compressor 24 of the turbofan engine 10 of FIG. 1 including the exemplary cooling system 100 of FIG. 5.

As stated, in other exemplary embodiments of the cooling system 100, the compressor fluid line 152 may be positioned at any suitable location to allow the nozzle 170 of the compressor fluid line 152 to inject a flow of cooling fluid to the aft end 80 of the HP compressor 24. The exemplary cooling system 100 of FIGS. 5 and 6 may be configured in substantially the same manner as the exemplary cooling system 100 described above with reference to FIGS. 2 through 4. However, for the embodiment depicted in FIGS. 5 and 6, the compressor fluid line 152 is mounted adjacent to or integrated into a compressor stator vanes 114 at the aft end 80 of the HP compressor 24. More particularly, for the embodiment depicted, the compressor fluid line 152 is fluidly connected to a fluid conduit extending through the stator vane 114. For the purposes of this disclosure, the fluid conduit extending through the stator vane 114 is considered the nozzle 170 of the compressor fluid line 152. The fluid conduit in the stator vane 114 defines an outlet proximate to the radially inner end 120 for injecting a flow of cooling fluid into the airflow at the aft end 80 of the HP compressor 24. Notably, with such a configuration, the three-way valve 156 is located outward of the core air flowpath 37 along the radial direction R.

It should be appreciated, however, that in other exemplary embodiments, the compressor fluid line 152 may additionally, or alternatively, be positioned at any other suitable location for injecting cooling fluid to the aft end of the HP compressor 24. For example, in other exemplary embodiments, a portion of the compressor fluid line 152 may be attached to, and extend along, a surface of the stator vane 114, with the nozzle 170 positioned proximate the radially inner end 120 of the stator vane 114. As with the exemplary embodiment of FIGS. 2 through 4, the exemplary cooling system 100 wall FIGS. 5 and 6 may include a plurality of compressor fluid lines 152 integrated into, or positioned adjacent to, stator vanes 114 and spaced along the circumferential direction C of the turbofan engine 10.

Reference will now be made to further exemplary embodiments of the present disclosure. For example, it should be appreciated that in still other exemplary embodiments of the present disclosure, the cooling system 100 may be configured to cool any other suitable components of the turbofan engine 10. For example, in other exemplary embodiments, such as with the various exemplary embodiments discussed below with reference to FIGS. 7 and 8, the cooling system 100 may additionally, or alternatively, be configured for cooling the one or more components of the compressor section, the turbine section, or the combustion section 26 not directly exposed to the core air flowpath 37. With such a configuration, the one or more fluid lines maybe configured for carrying a flow of the cooling fluid and providing the cooling fluid directly or indirectly to the one or more components of the compressor section, turbine section, or combustion section 26 not directly exposed to the core air flowpath 37.

Figure 7:
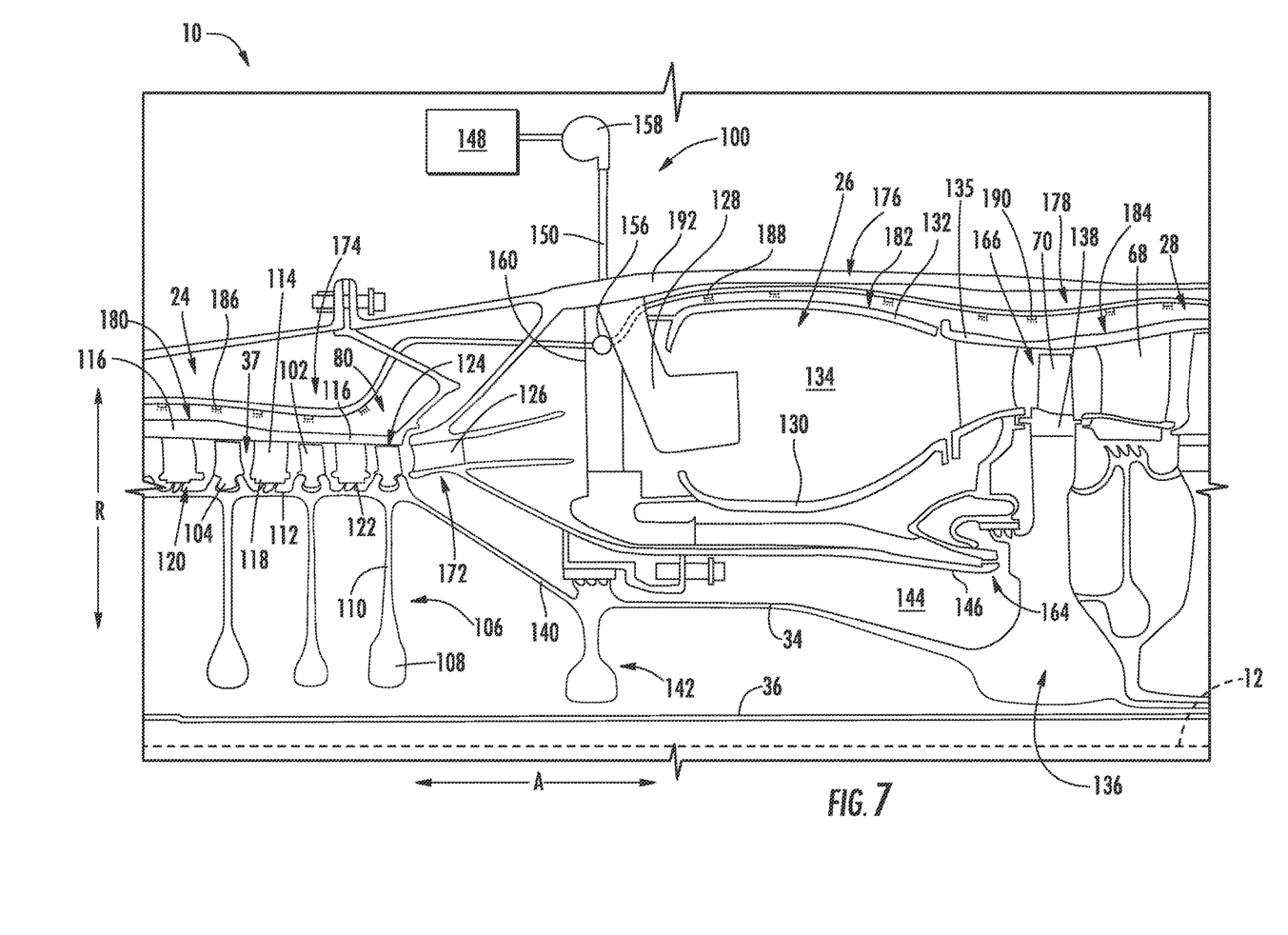
FIG. 7 is a close-up, simplified, schematic view of the exemplary gas turbine engine of FIG. 1 including a cooling system in accordance with yet another exemplary embodiment of the present disclosure.

Reference will now be made to FIG. 7, providing a simplified, schematic view of the turbofan engine 10 of FIG. 1 including a cooling system 100 in accordance with yet another exemplary embodiment of the present disclosure. The exemplary cooling system 100 of FIG. 7 may be configured in substantially the same manner as the exemplary cooling system 100 described above with reference to FIGS. 2 through 4. However, for the embodiment of FIG. 7, the one or more fluid lines include a compressor portion 174 for providing the cooling fluid to a liner of the compressor section, a combustion portion 176 for providing the cooling fluid to a liner of the combustion section 26, and a turbine portion 178 for providing the cooling fluid to a liner of the turbine section. More particularly, for the embodiment of FIG. 7, the compressor portion 174 of the one or more fluid lines is positioned adjacent to an outer surface 180 of the compressor liner 116 for spraying the cooling fluid on the outer surface 180 of the compressor liner 116. Additionally, the combustion portion 176 of the one or more fluid lines is positioned adjacent to an outer surface 182 of the outer combustion chamber liner 132 for spraying the cooling fluid on the outer surface 182 of the outer combustion chamber liner 132. Moreover, the turbine portion 178 of the one or more fluid lines is positioned adjacent to an outer surface 184 of the turbine liner 135 for spraying the cooling fluid on the outer surface 184 of the turbine liner 135.

For the embodiment depicted, the compressor portion 174 of the one or more fluid lines includes a plurality of nozzles 186, each nozzle 186 defining an outlet for spraying the cooling fluid onto the outer surface 180 of the compressor liner 116. Similarly, the combustion portion 176 of the one or more fluid lines also includes a plurality of nozzles 188, each nozzle 188 defining an outlet for spraying the cooling fluid onto the outer surface 182 of the outer combustion chamber liner 132. Further, the turbine portion 178 of the one or more fluid lines similarly includes a plurality of nozzles 190, each nozzle 190 defining an outlet for spraying the cooling fluid onto the outer surface 184 of the turbine liner 135. The plurality of nozzles 186, 188, 190 in the compressor portion 174, the combustion portion 176, and the turbine portion 178, respectively, of the one or more fluid lines are all generally spaced along the axial direction A.

It should be appreciated, however, that in other exemplary embodiments, the compressor portion 174, the combustor portion 176, and/or the turbine portion 178 of the one or more fluid lines may additionally, or alternatively, be configured for providing the cooling liquid indirectly to the respective compressor liner 116, outer combustion chamber liner 132, and turbine liner 135. For example, in other exemplary embodiments, the compressor portion 174, the combustor portion 176, and/or the turbine portion 178 of the one or more fluid lines may be configured for indirectly providing the cooling liquid to such components by spraying/injecting the cooling liquid into a flow of cooling air provided over such components. Such a flow of cooling air may be extracted from the compressor section of the turbofan engine 10.

Referring still to the embodiment depicted in FIG. 7, the compressor portion 174 of the one or more fluid lines is fluidly connected to the supply fluid line 150 via a valve 156. Similarly, the combustion portion 176 of the one or more fluid lines is fluidly connected to the supply fluid line 150 via the valve 156. Additionally, the turbine portion 178 of the one or more fluid lines is fluidly connected to the combustion portion 176 of the one or more fluid lines. In other exemplary embodiments, however, each of the compressor portion 174, combustion portion 176, and turbine portion 178 may be directly fluidly connected to the supply fluid line 150 via valve 156, and thus the exemplary valve 156 may be a four-way valve. In such an embodiment, the valve 156 may be configured to independently control an amount of cooling liquid provided through each of the compressor portion 174, combustion portion 176, and turbine portion 178 of the one or more fluid lines. Alternatively, however, each of the compressor portion 174, combustion portion 176, and turbine portion 178 may be configured in series flow with one another.

Additionally, although not depicted, in certain exemplary embodiments the one or more fluid lines, including each of the compressor portion 174, combustion portion 176, and turbine portion 178, may include a plurality of fluid lines with at least a portion of each of the plurality of fluid lines spaced generally along the circumferential direction C of the turbofan engine 10 within a casing 192 of the turbofan engine 10. For example, the plurality of fluid lines may each be spaced along the circumferential direction C in substantially the same manner that the plurality of compressor fluid lines 152 are spaced along the circumferential direction C, as described above with respect to FIG. 4. Such a configuration may provide for an even cooling fluid distribution over the outer surfaces 180, 182, 184 of the compressor liner 116, outer combustion chamber liner 132, and/or turbine liner 135, respectively, generally along the circumferential direction C. More particularly, such a configuration may provide for a substantially even temperature reduction across the compressor liner 116, the outer combustion chamber liner 132, and/or the turbine liner 135 generally along the circumferential direction C.

Notably, the exemplary cooling system 100 of FIG. 7 may be configured to inject cooling fluid through each of the compressor portion 174, the combustion portion 176, and/or the turbine portion 178, individually or cumulatively, at the same rate and/or the same ratio that the exemplary cooling system 100 described above with reference to FIGS. 2 through 4 is configured to provide cooling fluid through the compressor fluid line(s) 152.

Figure 8:
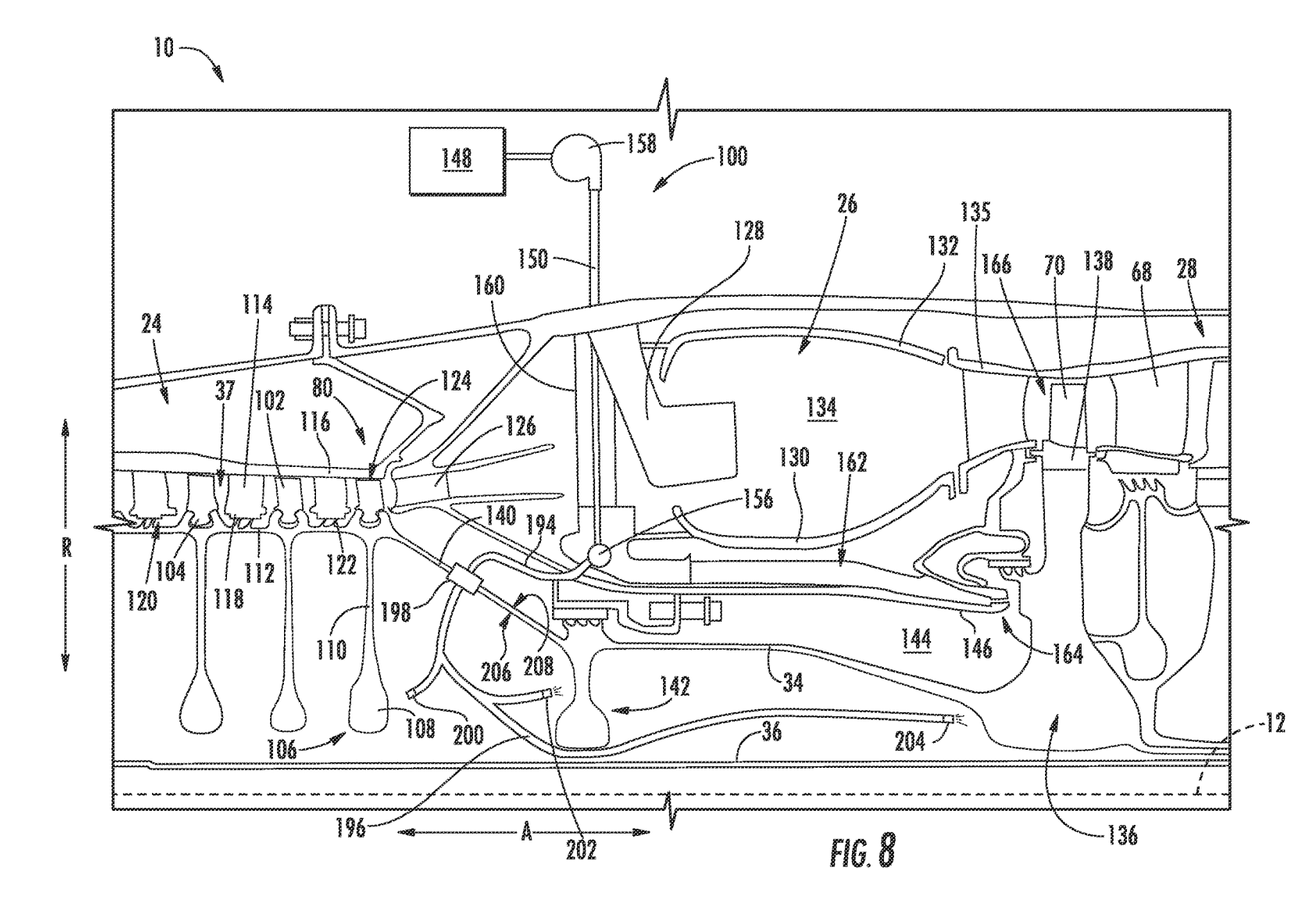
FIG. 8 is a close-up, simplified, schematic view of the exemplary gas turbine engine of FIG. 1 including a cooling system in accordance with still another exemplary embodiment of the present disclosure.

Referring now to FIG. 8, a cooling system 100 in accordance with yet another exemplary embodiment of the present disclosure is provided. FIG. 8 provides a simplified, schematic view of the turbofan engine 10 of FIG. 1 including a cooling system 100 in accordance with still another exemplary embodiment of the present disclosure.

The exemplary cooling system 100 of FIG. 8 is configured in substantially the same manner as the exemplary cooling system 100 of FIG. 7. Specifically, the exemplary cooling system 100 of FIG. 8 is configured for cooling one or more components of the compressor section, the turbine section, or the combustion section 26 not directly exposed to the core air flowpath 37. The exemplary cooling system 100 of FIG. 8, however, is alternatively configured to cool one or more of such components located inward of the core air flowpath 37 along the radial direction R.

Specifically, for the embodiment of FIG. 8, the cooling system 100 includes one or more fluid lines configured for providing the cooling fluid to a surface of the plurality of rotors 106 of the compressor section, a surface of the plurality of rotors 136 of the turbine section, and a surface of the compressor discharge pressure seal 142. Specifically, for the embodiment of FIG. 8, the one or more fluid lines include at least a first, outer fluid line 194 and a second, inner fluid line 196. The outer fluid line 194 is connected to the supply fluid line 150 via valve 156. Additionally, the exemplary cooling system 100 includes a static to rotating frame fluid transfer mechanism 198 attached to the arm 140 of the HP rotor shaft 34 and fluidly connected to the one or more fluid lines. Specifically, for the embodiment depicted, the outer fluid line 194 is fluidly connected to the inner fluid line 196 through the static to rotating frame fluid transfer mechanism 198. The inner fluid line 196 includes a plurality of nozzles—a first nozzle 200, a second nozzle 202, and a third nozzle 204—each nozzle defining an outlet. An outlet of the first nozzle 200 is positioned proximate to and is directed towards a surface of at least one of the plurality of HP compressor rotors 106. An outlet of the second nozzle 202 is positioned proximate to and is directed towards a surface of the compressor discharge pressure seal 142. Additionally, an outlet of the third nozzle 204 is positioned proximate to and is directed towards a surface of at least one of the plurality of HP turbine rotors 136.

In certain embodiments, the static to rotating frame fluid transfer mechanism 198 may be configured as one or more journal bearings operable with a plurality of circumferentially spaced and radially extending holes in the HP rotor shaft 34. For example, the static to rotating frame fluid transfer mechanism 198 may include an outer journal bearing extending around an outside surface 206 of the arm 140 of the HP rotor shaft 34. Specifically, the outer journal bearing may be positioned over a portion of the arm 140 of the HP rotor shaft 34 including the plurality of circumferentially spaced, radially extending holes for transferring cooling fluid. The mechanism 198 may also include an inner journal bearing extending within the arm 140 of the HP rotor shaft 34 adjacent to an inside surface 208 of the arm 140 of the HP rotor shaft 34, covering the plurality of circumferentially spaced and radially extending holes in the arm 140 of the HP rotor shaft 34. The outer journal bearing may be fluidly connected to the outer fluid line 194 and the inner journal bearing may be fluidly connected to the inner fluid line 196. However, in other exemplary embodiments, any other suitable means or mechanism 198 may be provided as the static to rotating frame fluid transfer mechanism 198.

Moreover, as with other embodiments of the exemplary cooling system 100, the exemplary cooling system 100 of FIG. 8 may further include a plurality of fluid lines with at least a portion of the plurality of fluid lines spaced along the circumferential direction C of the turbofan engine 10, inward of the core air flowpath 37 along the radial direction R. For example, the plurality of fluid lines may be spaced along the circumferential direction C in substantially the same manner as the plurality of compressor fluid lines 152 are spaced along the circumferential direction C as described above with reference to FIG. 4. Further, although the exemplary embodiment of FIG. 8 includes a single nozzle 200 positioned adjacent to and directed towards a surface of the plurality of HP compressor rotors 106, a single nozzle 202 positioned adjacent to and directed towards a surface of the compressor discharge pressure seal 142, and a single nozzle 204 positioned adjacent to and directed towards a surface of the HP turbine rotors 136, in other exemplary embodiments, the exemplary cooling system 100, or rather the one or more fluid lines, may include any other suitable number of nozzles. Alternatively, in other exemplary embodiments, the one or more fluid lines may not include one or more of the nozzles 200, 202, 204 directed at the HP compressor rotors 106, the compressor discharge pressure seal 142, or the HP turbine rotors 136, respectively.

Notably, the exemplary cooling system 100 of FIG. 8 may be configured to inject cooling fluid through the inner fluid lines 196 at the same rate and/or the same ratio that the exemplary cooling system 100 described above with reference to FIGS. 2 through 4 is configured to provide cooling fluid through the compressor fluid line(s) 152.

Moreover, it should be appreciated that in other exemplary embodiments, the second fluid line 196 of the one or more fluid lines may additionally, or alternatively, be configured for providing the cooling liquid indirectly to one or more of the compressor rotor 106, the compressor discharge pressure seal 142, and/or the turbine rotor 136. For example, in other exemplary embodiments, the second fluid line 196 of the one or more fluid lines may additionally, or alternatively, be configured for indirectly providing the cooling liquid to such components by spraying/injecting the cooling liquid into a flow of cooling air provided over such components. Such a flow of cooling air may be extracted from the compressor section of the turbofan engine 10.

Further, in still other exemplary embodiments of the present disclosure, the cooling system 100 may not include the inner fluid lines 196. For example, the one or more fluid lines of the cooling system 100 may simply include the outer fluid line 194 fluidly connected to the static to rotating frame fluid transfer mechanism 198, and the static to rotating frame fluid transfer mechanism 198 may be configured to spray the cooling fluid directly or indirectly on the one or more components of the compressor section, turbine section, or combustion section 26. With such an exemplary embodiment, the cooling system 100 may include a plurality of such mechanisms 198 positioned at any suitable location adjacent to the one or more components for cooling.

It should additionally be appreciated that in further exemplary embodiments of the present disclosure, aspects of the various exemplary cooling systems 100 may be combined with one another to arrive at still other exemplary embodiments. For example, in certain exemplary embodiments, aspects of the exemplary cooling system 100 described above with reference to FIGS. 2 through 4 may be combined with aspects of the exemplary cooling system 100 described above with reference to FIGS. 5 and 6, and/or the exemplary cooling system 100 described above with reference to FIG. 7, and/or the exemplary cooling system 100 described above with reference to FIG. 8.

Inclusion of a cooling system in accordance with the exemplary embodiments described above with reference to FIG. 7 and/or FIG. 8 in a gas turbine engine may increase a lifespan of the one or more components of the compressor section, combustion section, or turbine section being cooled. Additionally, or alternatively, the gas turbine engine including such a cooling system may not require the components being cooled by the exemplary cooling system of FIGS. 7 and/or 8 to be formed of certain rare and/or expensive materials capable of withstanding relatively extreme temperatures and loads. Accordingly, a cooling system in accordance with certain exemplary embodiments of the present disclosure may allow for more cost-efficient manufacturing of the gas turbine engine.

Figure 9:
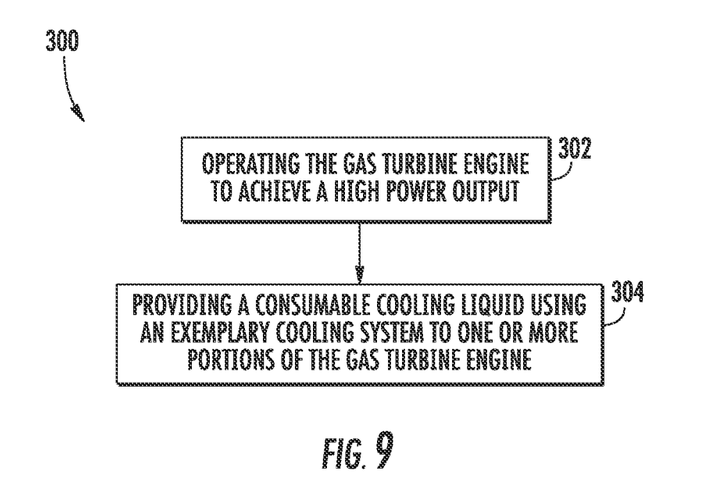
FIG. 9 is a flow diagram of an exemplary method for operating a gas turbine engine.

Referring now to FIG. 9, a method (300) for cooling a gas turbine engine in accordance with an exemplary embodiment of the present disclosure is provided. The gas turbine engine may, in certain exemplary aspects, be configured as the exemplary turbofan engine 10 described above with reference FIG. 1. Accordingly, in certain exemplary aspects, the gas turbine engine may define a core air flowpath extending through a compressor section, a combustion section, and a turbine section.

The exemplary method (300) includes at (302) operating the gas turbine engine to achieve a high power output. As used herein, a "high power output" refers to at least about seventy-five percent (75%) of the maximum power output of the gas turbine engine. For example, the gas turbine engine may be operated to achieve a high power output during takeoff and/or during climb operation modes of an aircraft including the exemplary gas turbine engine.

The exemplary method (300) also includes at (304) providing a consumable cooling liquid using an exemplary cooling system to one or more portions of the gas turbine engine. For example, in certain exemplary aspects, providing the consumable cooling liquid using the cooling system at (304) may include providing the consumable cooling liquid to compressed air proximate an aft stage of rotor blades in the compressor section and/or to one or more components of the compressor section proximate the aft stage of rotor blades in the compressor section. A cooling system in accordance with the exemplary embodiment described with reference to FIGS. 2 through 4 and/or with reference to FIGS. 5 and 6 may be used in such an exemplary aspect.

Additionally, or alternatively, in other exemplary aspects, providing the consumable cooling liquid using the cooling system to one or more portions of the gas turbine engine at (304) may include providing the consumable cooling liquid directly or indirectly to a surface of one or more components of the compressor section, combustion section, or the turbine section not directly exposed to the core air flowpath. For example, in certain exemplary aspect, providing the consumable cooling liquid to one or more portions of the gas turbine engine at (304) may include providing a consumable cooling liquid to one or more of an outer surface of a compressor liner, an outer surface of an outer combustion chamber liner, or to an outer surface of a turbine liner. A cooling system in accordance with the exemplary embodiment described above with reference to FIG. 7 may be used in such an exemplary aspect.

Additionally, or alternatively still, in certain exemplary aspects, providing the consumable cooling liquid using the cooling system to one or more components of the compressor section, combustion section, or the turbine section at (304) may include providing the consumable liquid directly or indirectly to one or more of a surface of one or more compressor rotors, a surface of one or more turbine rotors, and/or a surface of a compressor discharge pressure seal. A cooling system in accordance with the exemplary embodiment described above with reference to FIG. 8 may be used in such an exemplary aspect.

Notably, in at least certain exemplary aspects, providing the cooling liquid using the cooling system to one or more components of the gas turbine engine at (304) may include providing the consumable cooling liquid at the same rate and/or at the same ratio that the exemplary cooling system 100 of FIGS. 2 through 4 provides the cooling fluid through the exemplary compressor lines 152. For example, providing the cooling liquid using the cooling system to one or more components of the gas turbine engine at (304) may include providing up to about two pounds of consumable cooling liquid per second. Additionally, or alternatively, providing the consumable cooling liquid to one or more components of the gas turbine engine at (304) may include providing the consumable cooling liquid at a rate greater than about 0.05 percent of a mass flow rate of the air flowing through the core air flowpath, and less than about ten percent (10%) of the mass flow rate of the airflow into the core air flowpath.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine defining an axial direction, the gas turbine engine comprising:
   a compressor section for progressively compressing air, the compressor section including an aft-stage of rotor blades rotatable about the axial direction;
   a cooling system for cooling compressed air in or from the compressor section, the cooling system comprising
      a fluid tank for storing a volume of cooling fluid; and
         one or more fluid lines in fluid communication with the fluid tank, the one or more fluid lines including an outlet positioned adjacent to the aft-stage of rotor blades of the compressor section for injecting cooling fluid in an upstream direction into the compressed air proximate the aft-stage of rotor blades; and
      wherein the gas turbine engine further defines a radial direction, wherein the compressor section further includes a diffuser positioned aft of the aft-stage of rotor blades, and wherein the one or more fluid lines include a fluid line attached to a stationary component inward of the diffuser along the radial direction.

2. The gas turbine engine of claim 1, wherein the compressor section includes a low pressure compressor and a high pressure compressor, and wherein the aft-stage of rotor blades are positioned at an aft end of the high pressure compressor.

3. The gas turbine engine of claim 1, further comprising a turbine section including a first stage of rotor blades, wherein the one or more fluid lines include a compressor fluid line and a turbine fluid line, wherein the compressor fluid line is configured for injecting cooling fluid into the compressed air proximate the aft-stage of rotor blades, and wherein the turbine fluid line is configured for providing cooling fluid to at least one of the first stage of rotor blades of the turbine section or to an airflow proximate the first stage of rotor blades of the turbine section.

4. The gas turbine engine of claim 3, wherein the one or more fluid lines further include a supply fluid line in fluid communication with the fluid tank, wherein the cooling system further includes a valve, and wherein the valve includes an inlet fluidly connected with the supply fluid line, a first outlet fluidly connected to the compressor fluid line, and a second outlet fluidly connected to the turbine fluid line.

5. The gas turbine engine of claim 1, wherein the cooling system further includes a fluid pump for generating a flow of cooling fluid from the fluid tank through the one or more fluid lines.

6. The gas turbine engine of claim 1, wherein the one or more fluid lines include a plurality of fluid lines, the plurality of fluid lines each including an outlet, the outlets of the plurality of fluid lines circumferentially spaced around the gas turbine engine, and each outlet positioned adjacent to the aft-stage of rotor blades of the compressor section for injecting cooling fluid into the compressed air proximate the aft-stage of rotor blades.

7. The gas turbine engine of claim 6, wherein the plurality of fluid lines includes from fifteen (15) to thirty (30) cooling lines.

8. The gas turbine engine of claim 1, wherein the cooling fluid is a cooling liquid, and wherein the cooling system is configured to inject up to two (2) pounds of cooling liquid per second into the compressed air proximate the aft-stage of rotor blades.

9. The gas turbine engine of claim 1, wherein the cooling fluid is a cooling liquid, and wherein the cooling system is configured to inject cooling fluid at a rate greater than about 0.05% of a mass flow rate of compressed air flowing through the compressor section and less than about ten percent the mass flow rate of compressed air flowing through the compressor section.

10. The gas turbine engine of claim 1, wherein the cooling fluid is at least one of water or a glycol-water mixture.

11. The gas turbine engine of claim 1, wherein the one or more fluid lines include a nozzle defining the outlet, wherein the nozzle is configured to spray the cooling fluid generally towards a forward end of the compressor section.

12. The gas turbine engine of claim 1, wherein gas turbine engine further defines a radial direction, wherein the compressor section at least partially defines a core air flowpath, and wherein the fluid tank is positioned outward of the core air flowpath along the radial direction.

13. The gas turbine engine of claim 12, wherein at least one of the one or more fluid lines extend through the core air flowpath to a location inward of the core air flowpath along the radial direction.

14. The gas turbine engine of claim 1, wherein the cooling system operates to cool the compressor section during periods of peak power of the gas turbine engine.

15. A cooling system for cooling compressed air in or from a compressor section of an aeronautical gas turbine engine, the cooling system comprising:
a fluid tank for storing a volume of cooling liquid; and
one or more fluid lines in fluid communication with the fluid tank, the one or more fluid lines including an outlet and configured to be mounted such that the outlet is positioned adjacent to an aft-stage of rotor blades of the compressor section for injecting cooling liquid in an upstream direction into compressed air proximate the aft-stage of rotor blades of the compressor section; and
wherein the aeronautical gas turbine engine further defines a radial direction, wherein the compressor section further includes a diffuser positioned aft of the aft-stage of rotor blades, and wherein the one or more fluid lines include a fluid line attached to a stationary component inward of the diffuser along the radial direction.

16. The cooling system of claim 15, wherein the aeronautical gas turbine engine further includes a turbine section having a first stage of rotor blades, wherein the one or more fluid lines include a compressor fluid line and a turbine fluid line, wherein the compressor fluid line is configured for injecting cooling liquid into the compressed air proximate the aft-stage of rotor blades, and wherein the turbine fluid line is configured to provide cooling liquid to at least one of the first stage of rotor blades of the turbine section or to an airflow proximate the first stage of rotor blades of the turbine section.

17. The cooling system of claim 16, wherein the one or more fluid lines further include a supply fluid line in fluid communication with the fluid tank, wherein the cooling system further includes a valve, and wherein the valve includes an inlet fluidly connected with the supply fluid line, a first outlet fluidly connected to the compressor fluid line, and a second outlet fluidly connected to the turbine fluid line.

* * * * *